(12) United States Patent
Yadlapalli (10) Patent No.: US 11,067,591 B2
(45) Date of Patent: Jul. 20, 2021

(54) SYSTEM AND METHOD FOR DETERMINING ANGULAR DISPLACEMENT, VELOCITY AND ACCELERATION OF A ROTATING MEMBER MOUNTED TO A PLATFORM

(71) Applicant: Aktiebolaget SKF, Gothenburg (SE)

(72) Inventor: Venkata Nitin Mythreya Yadlapalli, Nellore (IN)

(73) Assignee: Aktiebolaget SKF, Gothenburg (SE)

( * ) Notice: Subject to any disclaimer, the term of this patent is extended or adjusted under 35 U.S.C. 154(b) by 56 days.

(21) Appl. No.: 16/701,504

(22) Filed: Dec. 3, 2019

(65) Prior Publication Data

US 2020/0182898 A1 Jun. 11, 2020

(30) Foreign Application Priority Data

Dec. 11, 2018 (IN) .......................... IN201841046773

(51) Int. Cl.
| | | |
|---|---|---|
| *G11B 19/20* | (2006.01) | |
| *G01P 3/36* | (2006.01) | |
| *G11B 7/125* | (2012.01) | |
| *G11B 7/007* | (2006.01) | |

(52) U.S. Cl.
CPC ................ *G01P 3/36* (2013.01); *G11B 7/125* (2013.01); *G11B 7/0079* (2013.01)

(58) Field of Classification Search
CPC ....... G11B 15/46; G11B 5/54; G11B 5/59605; G11B 5/5526; G11B 5/55; G11B 33/08; G11B 19/2009; G11B 19/2018; G11B 19/2027; G11B 19/2036; G11B 19/2045
USPC ....... 360/71, 73.08, 75, 77.02, 78.13, 97.12, 360/98.07, 97.19, 99.04, 99.08, 264.7
See application file for complete search history.

(56) References Cited

U.S. PATENT DOCUMENTS

2019/0339684 A1* 11/2019 Cella .................... G05B 13/028

* cited by examiner

*Primary Examiner* — Nabil Z Hindi
(74) *Attorney, Agent, or Firm* — Garcia-Zamor Intellectual Property Law; Ruy Garcia-Zamor; Bryan Peckjian (57) ABSTRACT

A system for determining angular displacement, velocity and acceleration of a rotating member axially mounted to a platform including at least one digital storage disk having data stored concentrically thereon, the disk and rotating member having the same axis of rotation, at least one laser transmitter for emitting a laser beam directed towards the disk, at least one laser receiver for receiving a reflected portion of the emitted laser beam, at least one processor, and at least one memory storing software thereon for determining the angular displacement, velocity and acceleration of the rotating member. A method for determining the angular displacement, velocity and acceleration of the rotating member is also provided.

13 Claims, 8 Drawing Sheets

SYSTEM AND METHOD FOR DETERMINING ANGULAR DISPLACEMENT, VELOCITY AND ACCELERATION OF A ROTATING MEMBER MOUNTED TO A PLATFORM

FIELD OF THE INVENTION

This invention relates to a system and method for determining angular displacement, velocity and acceleration. In particular, this invention relates to a system and method for determining angular displacement, velocity and acceleration of a rotating member mounted to a platform.

BACKGROUND

Figure 1A:
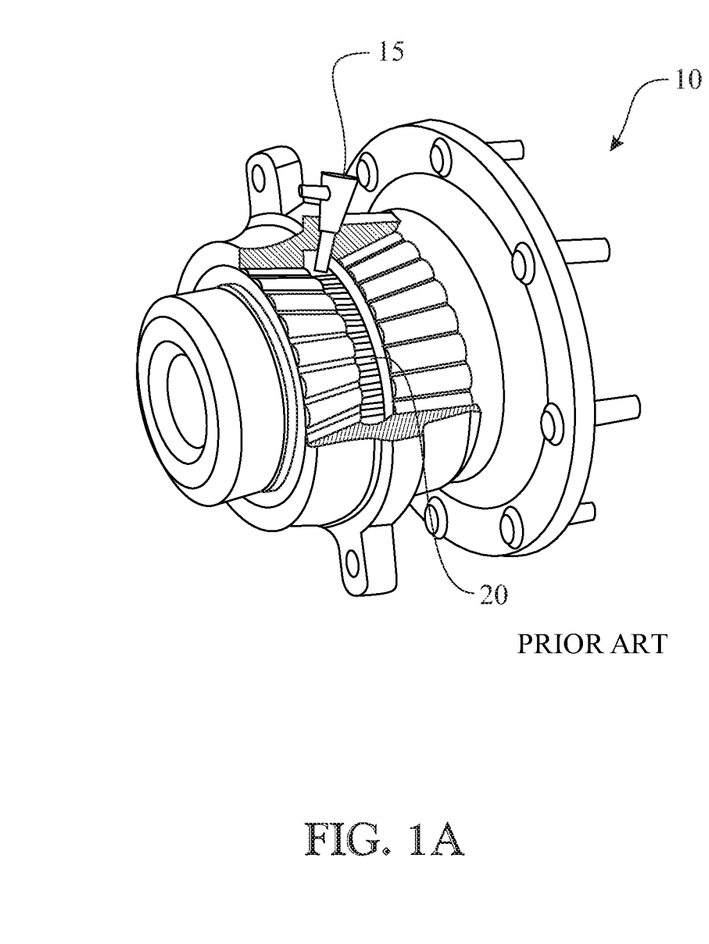
FIG. 1A depicts a first prior art wheel hub speed sensing system for determining angular displacement, velocity and acceleration of a rotating member mounted to a platform.

Wheel speed sensors are a necessary ABS component and sensor input in the automotive industry. The wheel speed sensor inputs are used to inform the ABS control module of rotational wheel speed. There are two types of sensing systems found on today's vehicles. FIG. 1A shows a passive wheel hub sensing system 10, while FIG. 2A shows an active wheel hub sensing system 30.

Figure 1B:
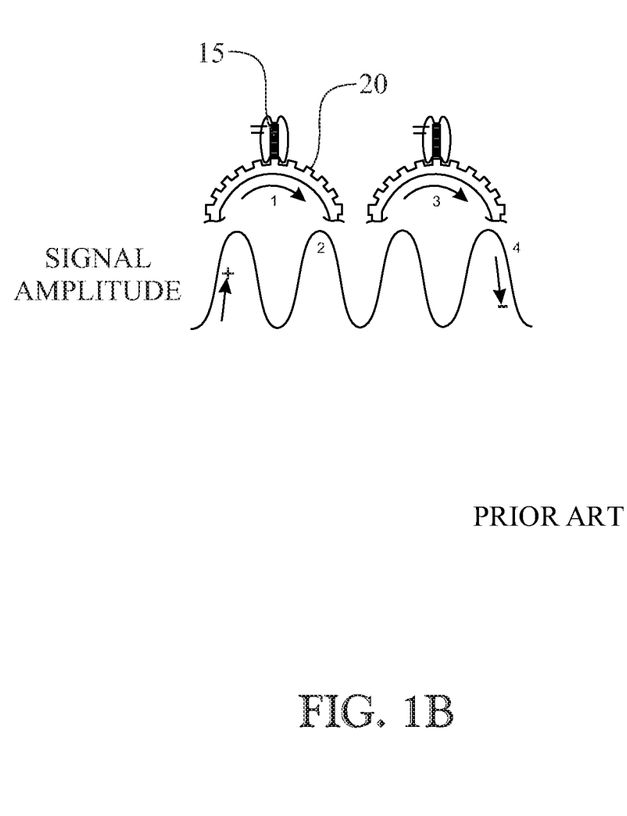
FIG. 1B depicts a waveform generated by the first prior art system of FIG. 1A.

A passive sensor 15, like the one shown in FIG. 1A creates an AC signal that changes frequency as the wheel changes speed. The ABS control module converts the AC signal shown in FIG. 1B to a digital signal for interpretation. It monitors all wheel speed inputs. If one wheel starts to rotate slower than the others, the system will reduce hydraulic pressure to that wheel until it regains traction. Passive prior art sensing uses toothed wheel (or slotted disk) 20 and functions on variable reluctance method. The accuracy depends on the number of teeth. The more teeth, the better the accuracy. FIG. 2B shows the generated voltage square waveform generated by passive sensing.

Figure 2A:
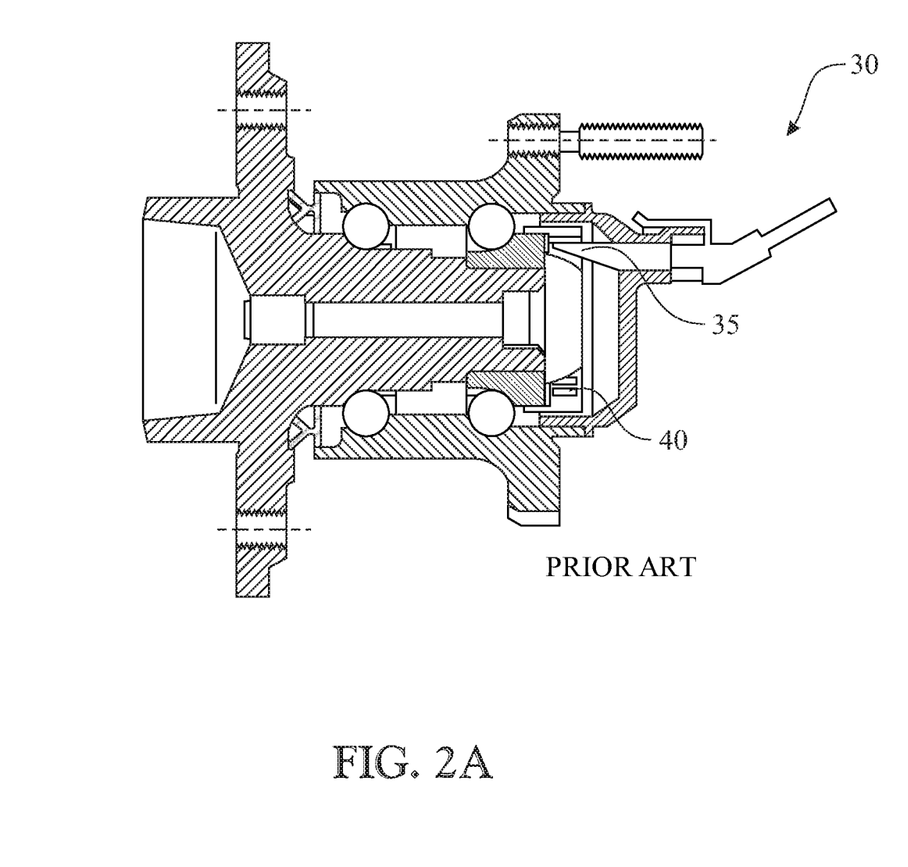
FIG. 2A depicts a prior art wheel hub speed sensing system for determining angular displacement, velocity and acceleration of a rotating member mounted to a platform.
Figure 2B:
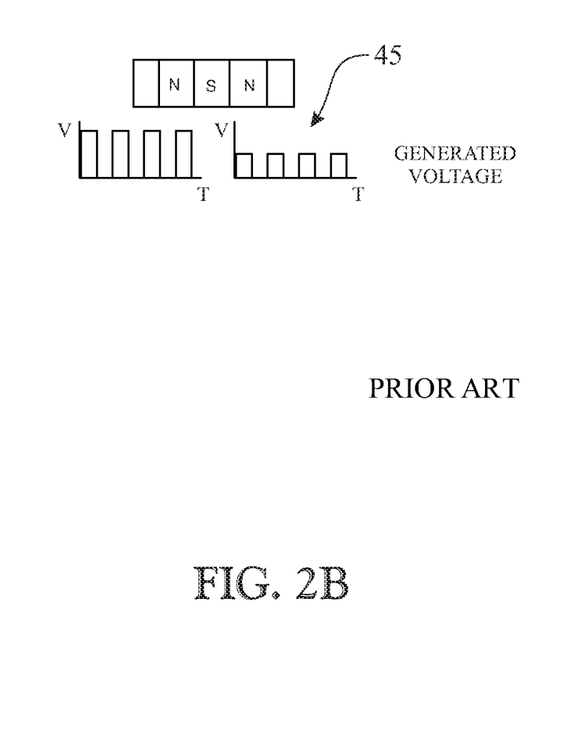
FIG. 2B depicts a waveform generated by the second prior art system of FIG. 2A.

An active sensor 35, like the one shown in FIG. 2A creates a generated voltage. Active prior art sensing uses magnetic flux generated from a rotating magnetic ring 40 and functions on Hall effect principle. The magnetic flux varies with the air gap and creates the square wave voltage. FIG. 2B shows the square wave voltage waveform 45 that is generated by active sensing.

SUMMARY

According to one or more embodiments a system for determining angular displacement, velocity and acceleration of a rotating member axially mounted to a platform is provided. The system including at least one digital storage disk having data stored concentrically thereon, the data being provided in the form of pits and lands, the disk mounted on an outer periphery of the rotating member, the disk and rotating member having the same axis of rotation, at least one laser transmitter for emitting a laser beam directed towards the disk, at least one laser receiver for receiving a reflected portion of the emitted laser beam, at least one processor, and at least one memory storing software thereon for determining the angular displacement, velocity and acceleration of the rotating member, the software comprising instructions being executable by the at least one processor to cause the system for determining the angular displacement, velocity and acceleration of the rotating member to: identify the number of bits per circumference of the disk counted during an initial test run to establish a calibrated bit count value, the calibrated bit count value being recorded into the memory, determine the number of bits per circumference of the disk counted during a verification cycle, the verification cycle bit count value being recorded into memory, determine a ratio between the number of bits counted during the calibration cycle against the number of bits counted during the verification cycle, and calculate an angular displacement of the rotating member based on the ratio determined between the calibrated cycle and verification cycle, calculate the angular displacement of the rotating member into angular velocity by taking the ratio of change in angular displacement with respect to time, and calculate the angular displacement of the rotating member into angular acceleration by taking the ratio of change in angular velocity with respect to time.

According to a first aspect of the invention the reflected portion received is obtained by the following protocol: when the laser beam falls on a pit, the laser beam scatters and nothing is received, which results in a digital 0 being recorded in a memory of a computer, when the laser beam falls on a land, the laser beam is reflected back towards the laser receiver, which results in a digital 1 being recorded into the computer memory.

According to a second aspect of the invention the platform is a wheel hub bearing assembly for a vehicle.

According to a third aspect of the invention the storage disk is a strip having a thickness of 0.1 mm to 1 cm.

According to another aspect of the invention the system is highly accurate because the number of pole pairs are greater than 48 and less than 500,000, which provides a resolution up to 1.5 seconds of an arc.

In another aspect of the present invention the outer periphery is a shield of a bearing.

In another aspect of the present invention the outer periphery is a rotating shaft.

In another aspect of the present invention the outer periphery is an inner ring.

In another aspect of the present invention the disk is insensitive to magnetic fields because it is made from non-magnetic materials.

In another aspect of the present invention the rotating member is associated with at least one of a brake drive, brake drum, racing and bullet trains, turbine, generator, pump motor, fan motor, cam shaft, gearbox, wheel slide protection system, condition monitoring system, high precision medical equipment, high speed industrial machines, robotics and automotive hubs.

In another aspect of the present invention a minimum thickness of the disk is equal to a width of the pit.

In a final embodiment of the present invention a system for determining angular displacement, velocity and acceleration of a wheel hub bearing assembly mounted to a vehicle is provided. The system comprising: at least one digital storage disk having data stored concentrically thereon, the data being provided in the form of pits and lands, the disk mounted on an outer periphery of the wheel hub, the disk and wheel hub having the same axis of rotation, at least one laser transmitter for emitting a laser beam directed towards the disk, at least one laser receiver for receiving a reflected portion of the emitted laser beam, at least one processor, and at least one memory storing software thereon for determining the angular displacement, velocity and acceleration of the rotating member, the software comprising instructions being executable by the at least one processor to cause the system for determining the angular displacement, velocity and acceleration of the wheel hub to: identify the number of bits per circumference of the disk counted during an initial test run to establish a calibrated bit count value, the calibrated bit count value being recorded into the memory, determine the number of bits per circumference of the disk counted during a verification cycle, the verification cycle bit count value being recorded into memory, determine a ratio between the number of bits counted during the calibration cycle against the number of bits counted during the verification cycle, and calculate an angular displacement of the wheel hub based on the ratio determined between the calibrated cycle and verification cycle, calculate the angular displacement of the wheel hub into angular velocity by taking the ratio of change in angular displacement with respect to time, and calculate the angular displacement of the wheel hub into angular acceleration by taking the ratio of change in angular velocity with respect to time.

In a further embodiment of the present invention a method for determining angular displacement, velocity and acceleration of a rotating member is provided. The method comprising: providing at least one digital storage disk having data stored concentrically thereon, the data being provided in the form of pits and lands, the disk mounted on an outer periphery of the rotating member, the disk and rotating member having the same axis of rotation, at least one laser transmitter for emitting a laser beam directed towards the disk, at least one laser receiver for receiving a reflected portion of the emitted laser beam, at least one processor, and at least one memory storing software thereon for determining the angular displacement, velocity and acceleration of the rotating member, the software comprising instructions being executable by the at least one processor to cause the system for determining the angular displacement and velocity of the rotating member to carry out the following steps: identifying the number of bits per circumference of the disk counted during an initial test run to establish a calibrated bit count value, the calibrated bit count value being recorded into the memory, determining the number of bits per circumference of the disk counted during an verification cycle, the verification cycle bit count value being recorded into memory, determining a ratio between the number of bits counted during the calibration cycle against the number of bits counted during the verification cycle, calculating an angular displacement of the rotating member based on the ratio determined between the calibrated cycle and verification cycle, calculating the angular velocity by taking the ratio of change in angular displacement with respect to time, and calculating the acceleration by taking the ratio of change in angular velocity with respect to time.

BRIEF DESCRIPTION OF THE DRAWINGS

The invention will now be described, by way of example, with reference to the accompanying drawings, in which.

DETAILED DESCRIPTION

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIGS. 1A, 1B, 2A, and 2B that depict the prior art were already disclosed in the Background and will not further be mentioned henceforth.

Figure 3:
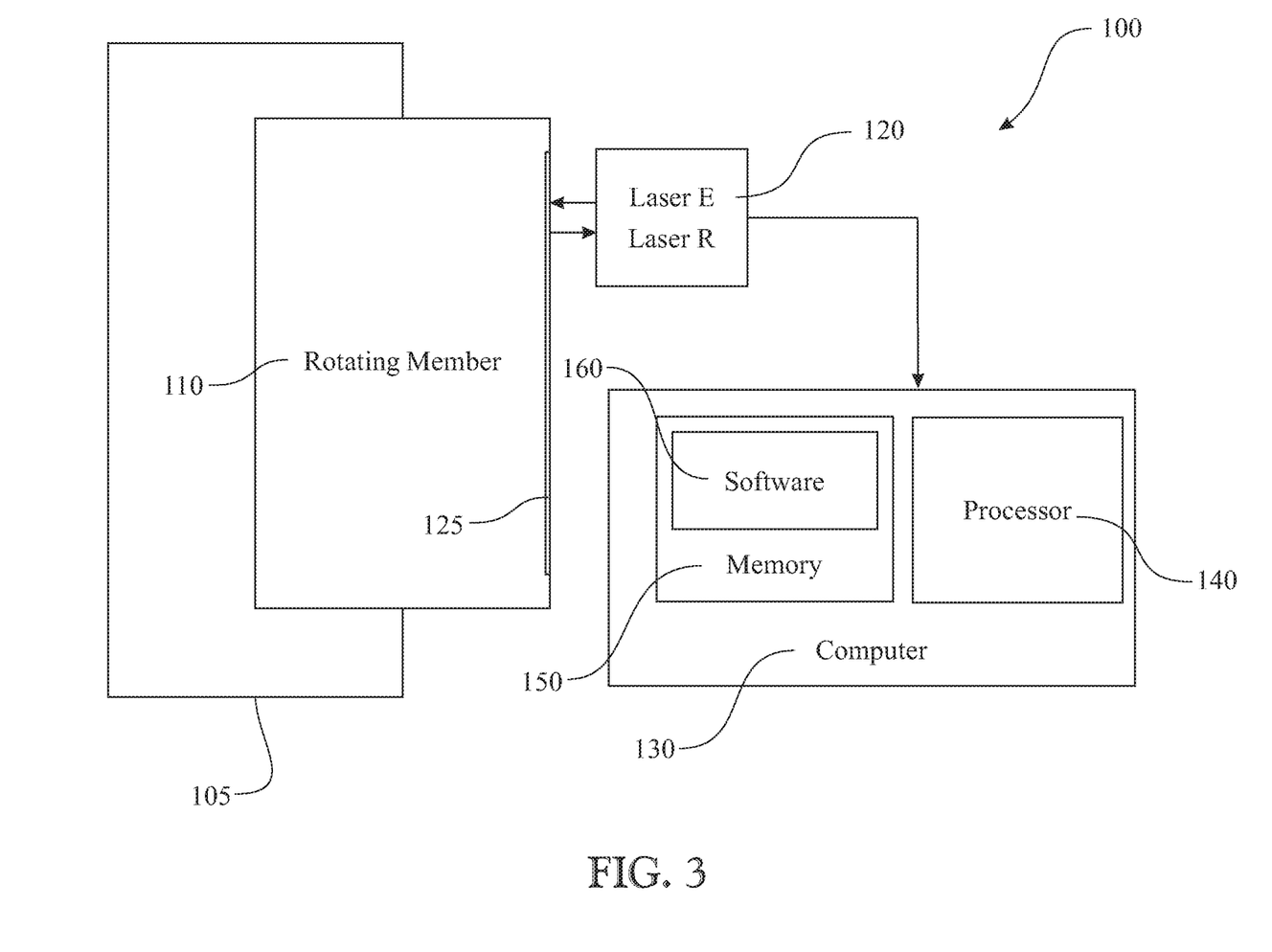
FIG. 3 depicts a block diagram of a processor-implemented system for determining angular displacement, velocity and acceleration of a rotating member mounted to a platform in accordance with one or more embodiments.
Figure 4:
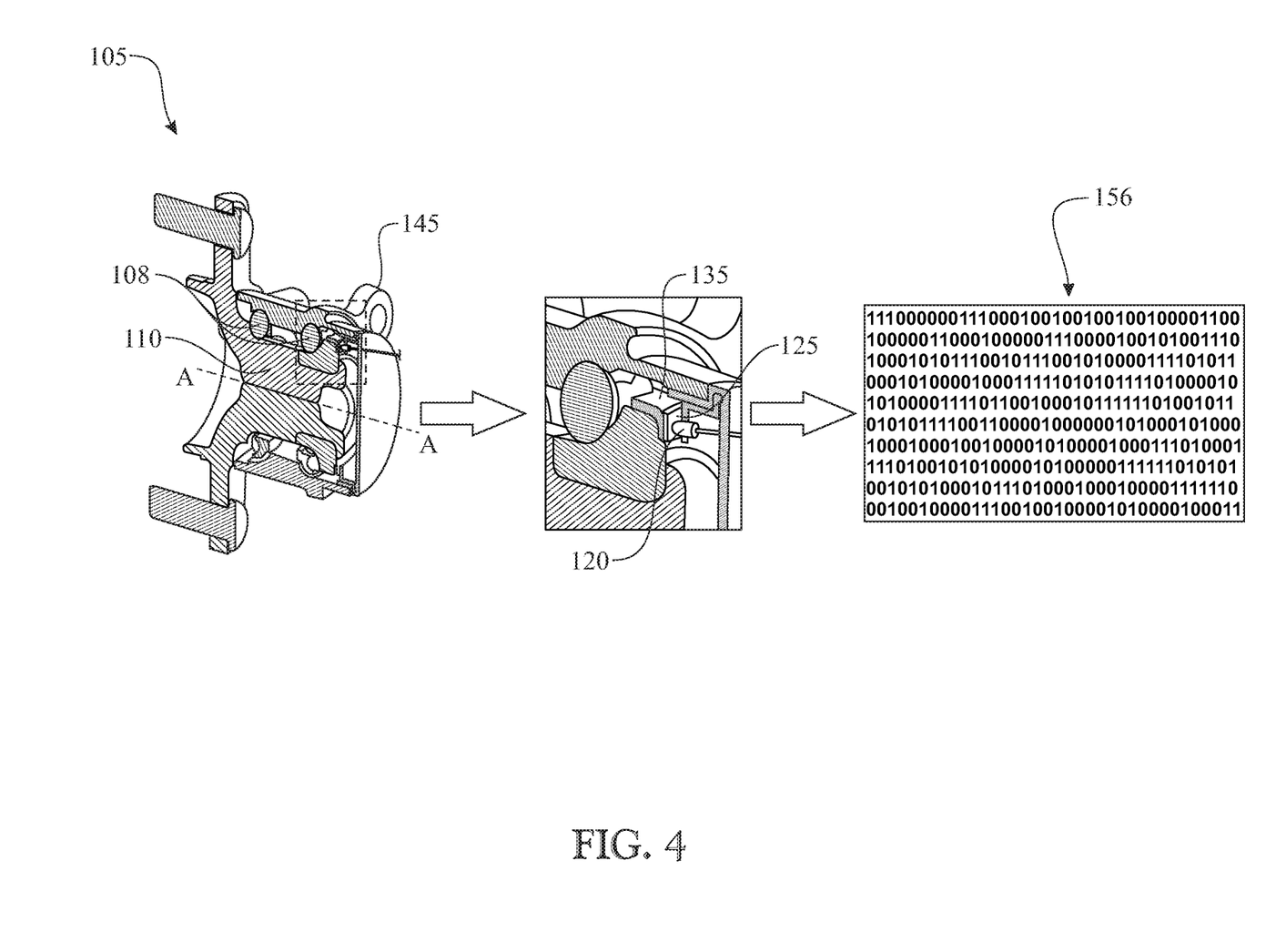
FIG. 4 depicts a schematic diagram of the system and data being read for determining angular displacement, velocity and acceleration of a rotating member mounted to a platform in accordance with one or more embodiments.

FIG. 3 depicts a system 100 for determining angular displacement, velocity and acceleration in accordance with one or more embodiments of the present invention. The system 100 comprises a rotating member 110 axially mounted within a platform 105. See also FIG. 4. In this case, the platform is a wheel bearing hub assembly 105 having a fixed portion 145 and the at least one rotating member 110 mounted therein. The fixed portion 145 of the platform 105 typically supports the axial mounted rotating member 110 via a plurality of bearing rollers 108 disposed therebetween.

Examples of rotating members axially mounted within the platforms and/or that the rotating member may provide, but is not limited to, one of a brake drive, brake drum, racing and bullet trains, turbine, generator, pump motor, fan motor, cam shaft, gearbox, wheel slide protection system, condition monitoring system, high precision medical equipment, high speed industrial machines, robotics and automotive hubs, drivetrains, axles, bogies with axles, axle boxes, traction motors, wheels, gear wheels, impellers, bearings, stators, rotors, electrical rotors, turbines, shafts, and windings.

The system 100 further includes at least one digital storage disk 125 having data 155 stored concentrically thereon. Here, the disk is insensitive to magnetic fields because it is made from non-magnetic materials.

Figure 6:
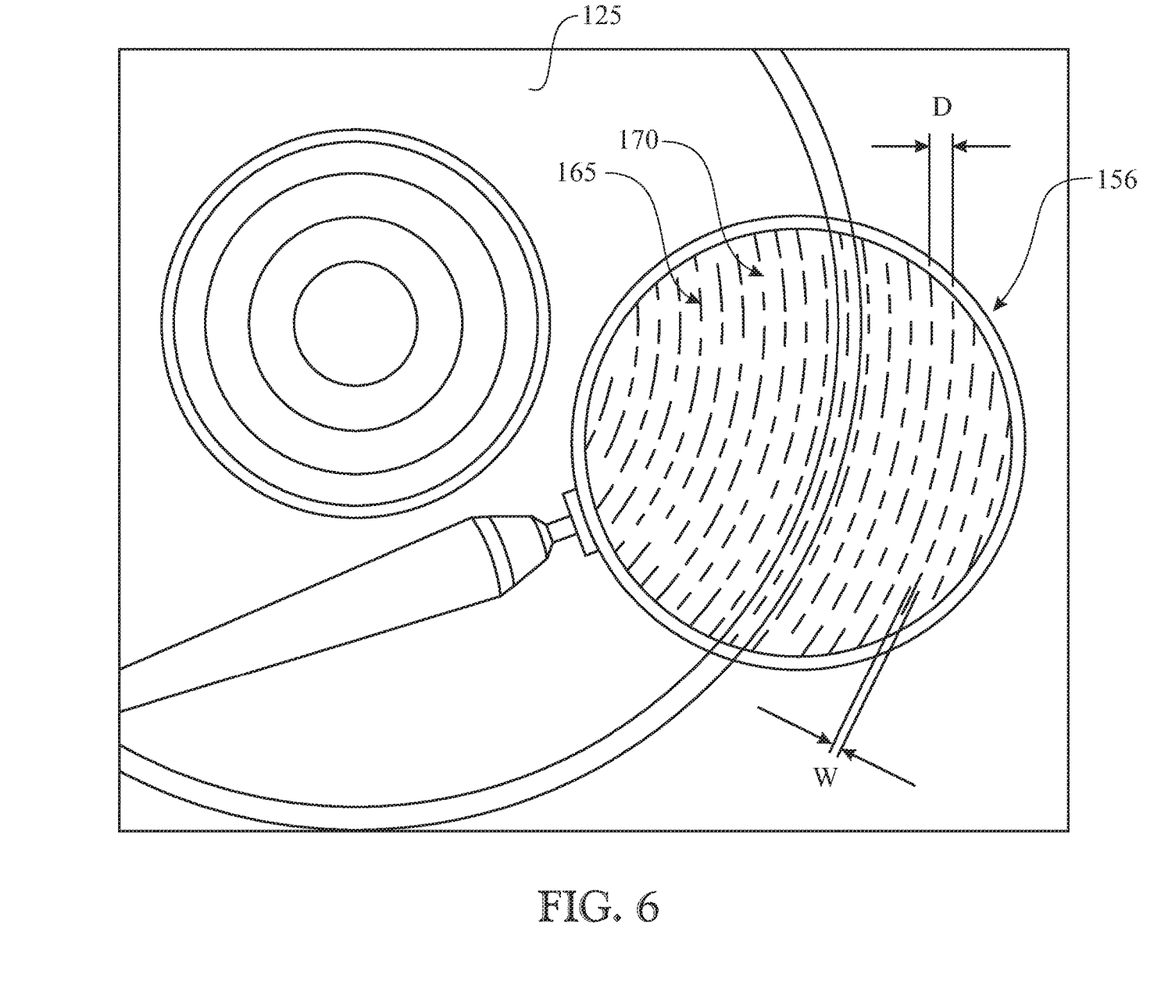
FIG. 6 depicts a magnified view of the various pits and lands disposed on a concentric digital storage disk in accordance with one or more embodiments.

The data 155 is provided in the form of pits 165 and lands 170. The pits 165 and lands 170 are recorded on a surface 156 of the disk 125. See also FIG. 6. Here, the disk 125 is mounted on an outer periphery 135 of the rotating member 110. The disk 125 and rotating member 110 have the same axis A of rotation.

The system 100 also provides a computer 130. The computer 130 includes a processor 140 and a memory 150 that contains software 160 disposed thereon for determining the angular displacement, velocity and acceleration of the rotating member 110. The software 160 comprises instructions that are executable by the at least one processor 140.

The system 100 further provides a combination laser transmitter and receiver 120. The combination laser transmitter and receiver 120 includes a laser transmitter portion LE that emits a laser beam directed towards the disk 125. The combination laser transmitter and receiver 120 further includes a laser receiver LR that receives a reflected portion of the emitted laser beam LE.

The reflected portion received is obtained by the following protocol. When the emitted laser beam LE falls on a pit 165, the laser beam scatters and nothing is received. This results in a digital 0 being recorded in the memory 150 of the computer 130.

Alternately, when the emitted laser beam LE falls on a land 170, the emitted laser beam is reflected back towards the laser receiver LR portion. The received laser beam results in a digital 1 being recorded into the memory 150 of the computer 130.

As previously mentioned, the software 160 comprises instructions stored within the memory 150 that are executable by the at least one processor 140 to carry out the following system functions that will be disclosed henceforth.

Calibration Cycle

The number of bits per circumference of the disk counted during an initial test run are initially identified in order to establish a calibrated bit count threshold value. Here, the rotating member 125 of the system 100 is tested at a rated speed and a predetermined circumference in order to determine the calibrated bit count threshold value of 1's and 0's. This is done in association with the data recorded (or burnt) onto the disk 125.

Once identified, the calibrated bit count threshold value is recorded into the memory 150 and may be recalled for future processing/analysis or display. The software 160 in association with the processor 140 takes into account the frequency at which the combined laser beam emitter and receiver emits and receives the reflected beams off of the disk as it rotates during testing via an algorithm.

Figure 7:
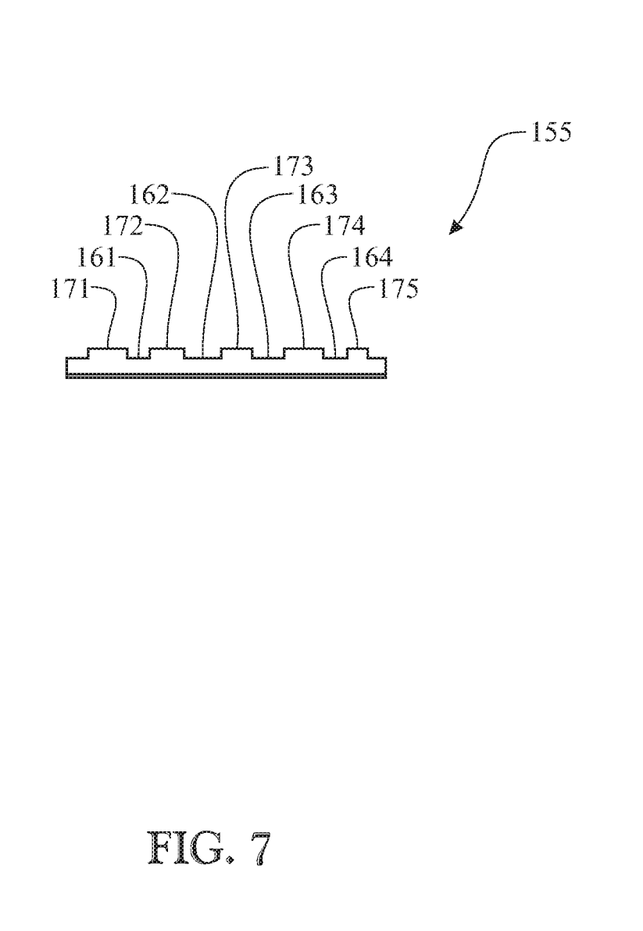
FIG. 7 depicts a cross-section of various data pole sizes in the range of microns written onto an outer surface of a digital storage disk in accordance with one or more embodiments.

FIG. 7 shows various micron pole sizes of the pits and lands as they may be recorded into the circular disk 125. The pits are denoted by references 161-164 and the lands are denoted by references 171, 171, 173, 174, and 175. As can be seen, different pole sizes may be provided to create different bit counts. That is, the pole sizes may be adjusted to be longer or shorter in length as shown. The lengths of the pole sizes are predetermined depending upon the desired bit count. As such, the pole sizes can be configured to obtain a desired bit count.

The same applies to the pits 161, 162, 163, and 164. Using the technology of the present invention, the pole sizes can be advantageously provided in the micron range. This allows a configuration that provides the number of poles magnitudes greater than that of the prior art. This is because the system 100 may be configured to include a number of pole pairs with as many as 500,000 that would provide an angular resolution up to 1.5 seconds of an arc.

Figure 5:
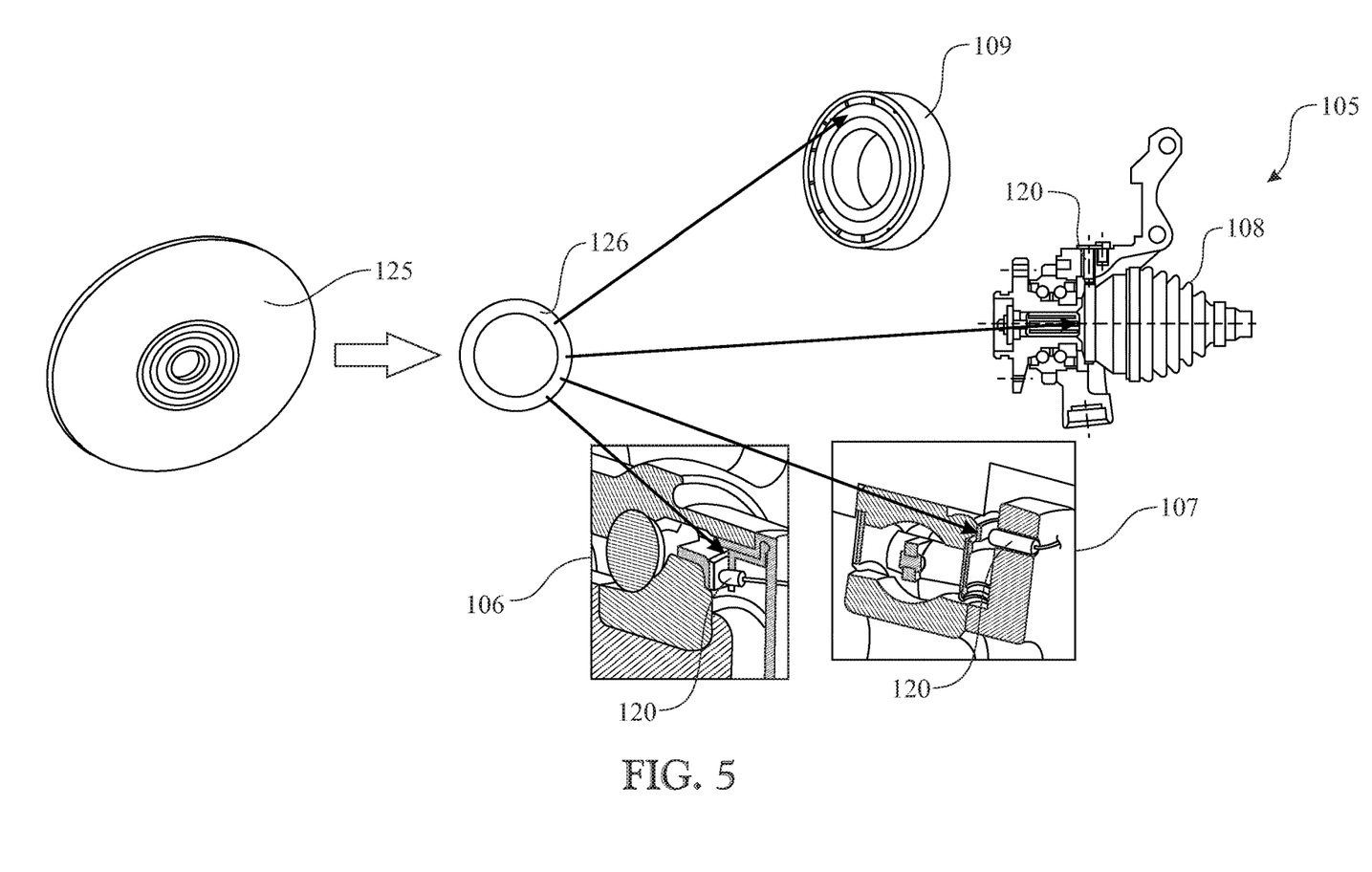
FIG. 5 depicts schematic diagram showing various exemplary implementations of a digital storage data disk in accordance with one or more embodiments.
Figure 8:
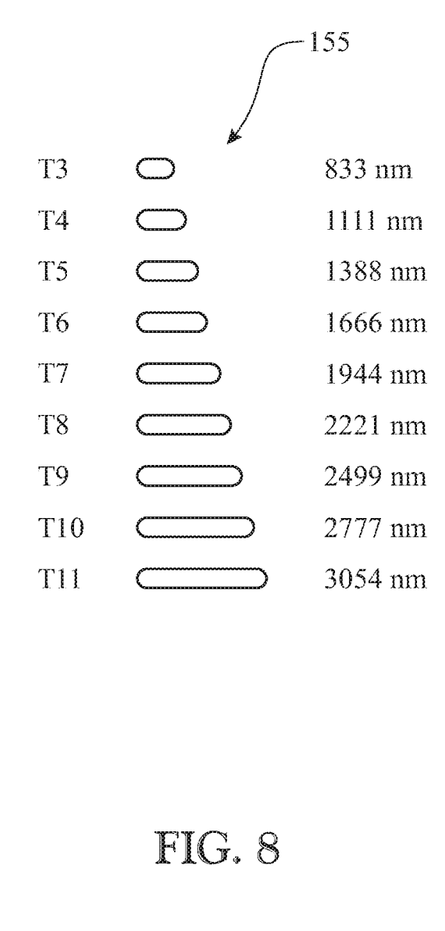
FIG. 8 depicts a top plan view of various data pole dimensions written onto the outer surface of a digital storage disk in accordance with one or more embodiments.

FIG. 8 shows various pole dimensions T3, T4, T5, T6, T7, T8, T9, T10 and T11. The pole dimensions may range from 833 nm to 3054 nm. The center of the digital storage disk 125 may be removed. This leaves a circular strip or ring 126 as shown in FIG. 5. The circular strip or ring 126 may be provided with a thickness in the range of 0.1 mm to 1 cm. However, a thickness of the disk adheres to the following rule: a minimum thickness of the disk 125 is equal to a width W of the pit.

FIG. 5 shows implementations of the strip or ring 126 being mounted to various outer peripheries. For example, the ring 126 may be mounted to an outer periphery of a bearing shield 109. FIG. 5 optionally shows the ring 126 being mounted to an outer periphery of an inner ring 106. FIG. 5 optionally shows the ring 126 being mounted to an outer periphery of a rotating shaft of an outer ring 107. FIG. 5 optionally shows the ring 126 being mounted to an outer periphery of a drive shaft 108.

Verification Cycle

The number of bits per circumference of the disk counted during a verification cycle is then determined. A verification cycle may be run directly after being installed into a vehicle (not shown) or for example could be run during a routine service in a repair shop after two years of vehicle operation. As such, the time that has lapsed between the calibration cycle and when the verification cycles are run is not fixed. Here, the system 100 is tested under the same conditions that the calibration cycle was tested. Once determined, the verification cycle bit count value is stored into the memory 150 and may be recalled for future processing/analysis or display.

Angular Displacement

A ratio between the number of bits counted during the calibration cycle determined versus the number of bits counted during the verification cycle is determined by the software 160 (an algorithm) stored within the memory 150. An angular displacement of the rotating member is calculated based on the ratio determined between the calibrated cycle and the verification cycle. Once again, this function is carried out by processor the software 160 stored within the memory 150. Once identified, the angular displacement is recorded into the memory 150 and may be recalled for future processing/analysis or display.

Angular Velocity

The angular displacement of the rotating member determined above is calculated into angular velocity by taking a ratio of the change in angular displacement with respect to time. Once identified, the angular velocity value is recorded into the memory 150 and may be recalled for future processing/analysis or display.

Angular Acceleration

The angular velocity of the rotating member determined above is calculated into angular acceleration by taking the ratio of change in angular velocity with respect to time. Once identified, the angular acceleration value is recorded into the memory 150 and may be recalled for future processing/analysis or display.

The at least one processor 140 can comprise one or more central processing units (CPU(s)), also referred to as processing circuits, coupled via a system bus to the at least one memory 150 and various other components. The at least one processor 140 executes a software 160 of the system 100 for performing the above referenced system calculations.

The at least one memory 180 can include a read only memory (ROM) and a random access memory (RAM). The ROM is coupled to the system bus and may include a basic input/output system (BIOS), which controls certain basic functions of the system. The RAM is read-write memory coupled to the system bus for use by the at least one processor 160. The at least one memory 180 is an example of a tangible storage medium readable by the at least one processor 160, where the software 180 is stored as instructions for execution by the at least one processor 160 to cause the system 100 for performing vector analysis to operate, such as is described herein.

Figure 9:
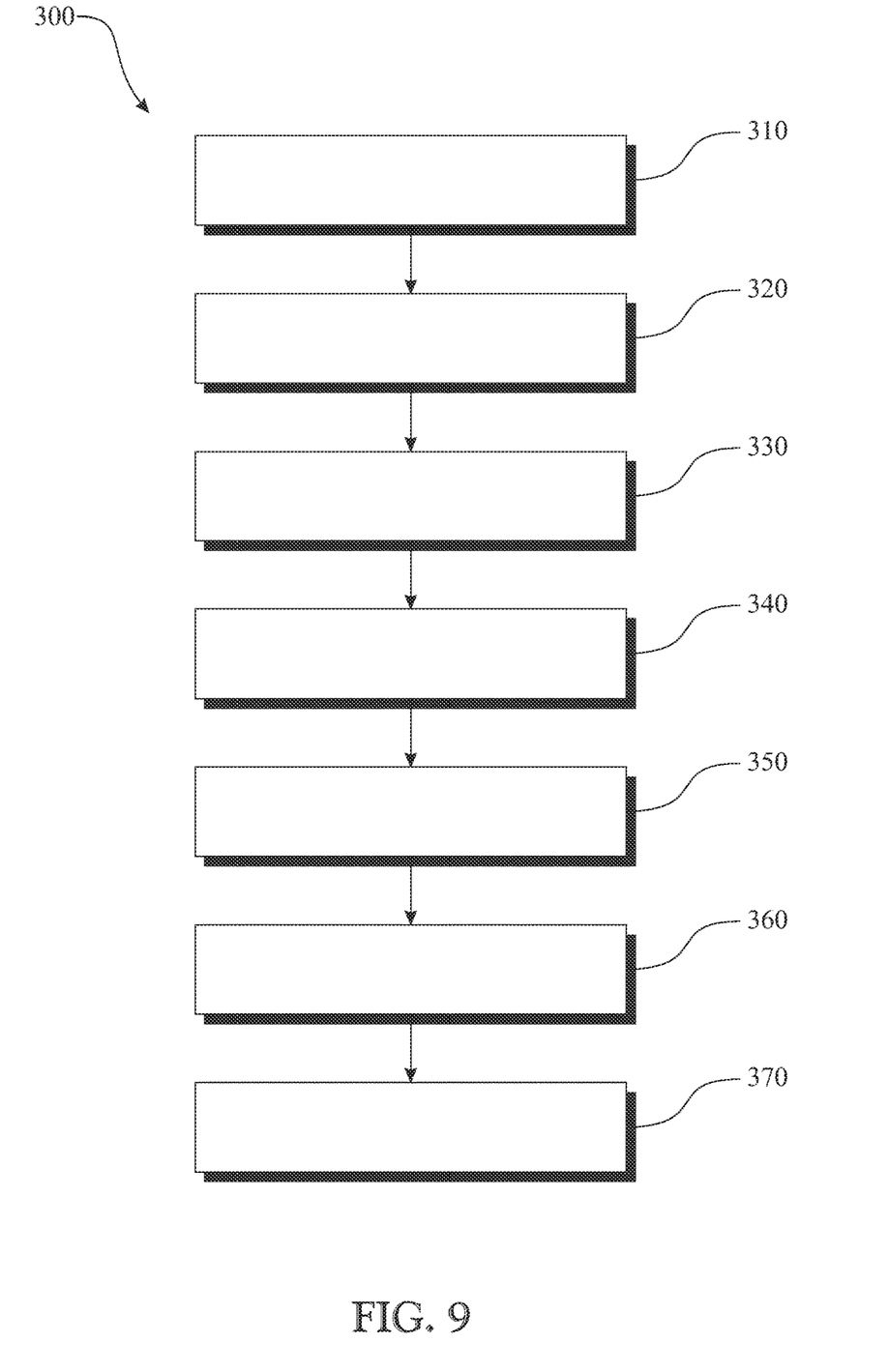
FIG. 9 depicts a flow diagram of the system for determining angular displacement, velocity and acceleration of a rotating member mounted to a platform in accordance with one or more embodiments.

FIG. 9 depicts a process flow 300 of the processor-implemented method for determining angular displacement, velocity and acceleration of a rotating member.

The method first comprises a step 310 of providing at least one digital storage disk having data stored concentrically thereon. The data is provided in the form of pits and lands. The disk is mounted on an outer periphery of the rotating member. The disk and rotating member have the same axis of rotation, at least one laser transmitter for emitting a laser beam directed towards the disk, at least one laser receiver for receiving a reflected portion of the emitted laser beam, at least one processor, and at least one memory storing software thereon for determining the angular displacement, velocity and acceleration of the rotating member. The software comprises instructions executable by the at least one processor to cause the system for determining the angular displacement and velocity of the rotating member to carry out the following steps.

In step 320, identifying the number of bits per circumference of the disk counted during an initial test run to establish a calibrated bit count value, the calibrated bit count value being recorded into the memory.

In step 330, determining the number of bits per circumference of the disk counted during a verification cycle, the verification cycle bit count value being recorded into memory.

In step 340, determining a ratio between the number of bits counted during the calibration cycle against the number of bits counted during the verification cycle.

In step 350, calculating an angular displacement of the rotating member based on the ratio determined between the calibrated cycle and verification cycle.

In step 360, calculating the angular velocity by taking the ratio of change in angular displacement with respect to time, and in step 370, calculating the acceleration by taking the ratio of change in angular velocity with respect to time.

The current prior art designs used in the industry have the manufacturing constraint of only producing a limited number of pole pairs, which is less than 48. The invention disclosed herein increases the pole pairs by magnitudes and improves accuracy up to 1.5 seconds of an arc. Moreover, the manufacturing is made simpler which provides a cost-effective solution. The size of the device can be reduced tremendously as well.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A system for determining angular displacement, velocity and acceleration of a rotating member axially mounted to a platform, the system comprising:
    at least one digital storage disk having data stored concentrically thereon, the data being provided in the form of pits and lands, the disk mounted on an outer periphery of the rotating member, the disk and rotating member having the same axis of rotation,
    at least one laser transmitter for emitting a laser beam directed towards the disk,
    at least one laser receiver for receiving a reflected portion of the emitted laser beam,
    at least one processor, and
    at least one memory storing software thereon for determining the angular displacement, velocity and acceleration of the rotating member, the software comprising instructions being executable by the at least one processor to cause the system for determining the angular displacement, velocity and acceleration of the rotating member to:
    identify the number of bits per circumference of the disk counted during an initial test run to establish a calibrated bit count value, the calibrated bit count value being recorded into the memory,
    determine the number of bits per circumference of the disk counted during a verification cycle, the verification cycle bit count value being recorded into memory,
    determine a ratio between the number of bits counted during the calibration cycle against the number of bits counted during the verification cycle, and
    calculate an angular displacement of the rotating member based on the ratio determined between the calibrated cycle and verification cycle,
    calculate the angular displacement of the rotating member into angular velocity by taking the ratio of change in angular displacement with respect to time, and
    calculate the angular displacement of the rotating member into angular acceleration by taking the ratio of change in angular velocity with respect to time.

2. The system for determining angular displacement and velocity of a rotating member mounted to a platform according to claim 1, wherein the reflected portion received is obtained by the following protocol:
    when the laser beam falls on a pit, the laser beam scatters and nothing is received, which results in a digital 0 being recorded in a memory of a computer,
    when the laser beam falls on a land, the laser beam is reflected back towards the laser receiver, which results in a digital 1 being recorded into the computer memory.

3. The system for determining angular displacement and velocity of a rotating member mounted to a platform according to claim 1, wherein the platform is a wheel hub bearing assembly for a vehicle.

4. The system for determining angular displacement and angular velocity of a rotating member mounted to a platform according to claim 1, wherein the storage disk is a strip having a thickness of 0.1 mm to 1 cm.

5. The system for determining angular displacement and angular velocity of a rotating member mounted to a platform according to claim 1, wherein the system is highly accurate because the number of pole pairs are greater than 48 and less than 500,000, which provides a resolution up to 1.5 seconds of an arc.

6. The system for determining angular displacement and angular velocity of a rotating member mounted to a platform according to claim 1, wherein the outer periphery is a shield of a bearing.

7. The system for determining angular displacement and angular velocity of a rotating member mounted to a platform according to claim 1, wherein the outer periphery is a rotating shaft.

8. The system for determining angular displacement and angular velocity of a rotating member mounted to a platform according to claim 1, wherein the outer periphery is an inner ring.

9. The system for determining angular displacement and angular velocity of a rotating member mounted to a platform according to claim 1, wherein the disk is insensitive to magnetic fields because it is made from non-magnetic materials.

10. The system for determining angular displacement and angular velocity of a rotating member mounted to a platform according to claim 1, wherein the rotating member is associated with at least one of a brake drive, brake drum, racing and bullet trains, turbine, generator, pump motor, fan motor, cam shaft, gearbox, wheel slide protection system, condition monitoring system, high precision medical equipment, high speed industrial machines, robotics and automotive hubs.

11. The system for determining angular displacement and angular velocity of a rotating member mounted to a platform according to claim 2, wherein a minimum thickness of the disk is equal to a width of the pit.

12. A system for determining angular displacement, velocity and acceleration of a wheel hub bearing assembly mounted to a vehicle, the system comprising:
- at least one digital storage disk having data stored concentrically thereon, the data being provided in the form of pits and lands, the disk mounted on an outer periphery of the wheel hub, the disk and wheel hub having the same axis of rotation,
- at least one laser transmitter for emitting a laser beam directed towards the disk,
- at least one laser receiver for receiving a reflected portion of the emitted laser beam,
- at least one processor, and
- at least one memory storing software thereon for determining the angular displacement, velocity and acceleration of the rotating member, the software comprising instructions being executable by the at least one processor to cause the system for determining the angular displacement, velocity and acceleration of the wheel hub to:
- identify the number of bits per circumference of the disk counted during an initial test run to establish a calibrated bit count value, the calibrated bit count value being recorded into the memory,
- determine the number of bits per circumference of the disk counted during a verification cycle, the verification cycle bit count value being recorded into memory,
- determine a ratio between the number of bits counted during the calibration cycle against the number of bits counted during the verification cycle, and
- calculate an angular displacement of the wheel hub based on the ratio determined between the calibrated cycle and verification cycle,
- calculate the angular displacement of the wheel hub into angular velocity by taking the ratio of change in angular displacement with respect to time, and
- calculate the angular displacement of the wheel hub into angular acceleration by taking the ratio of change in angular velocity with respect to time.

13. A method for determining angular displacement, velocity and acceleration of a rotating member, the method comprising:
- providing at least one digital storage disk having data stored concentrically thereon, the data being provided in the form of pits and lands, the disk mounted on an outer periphery of the rotating member, the disk and rotating member having the same axis of rotation, at least one laser transmitter for emitting a laser beam directed towards the disk, at least one laser receiver for receiving a reflected portion of the emitted laser beam, at least one processor, and at least one memory storing software thereon for determining the angular displacement, velocity and acceleration of the rotating member,
- the software comprising instructions being executable by the at least one processor to cause the system for determining the angular displacement and velocity of the rotating member to carry out the following steps:
- identifying the number of bits per circumference of the disk counted during an initial test run to establish a calibrated bit count value, the calibrated bit count value being recorded into the memory,
- determining the number of bits per circumference of the disk counted during an verification cycle, the verification cycle bit count value being recorded into memory,
- determining a ratio between the number of bits counted during the calibration cycle against the number of bits counted during the verification cycle,
- calculating an angular displacement of the rotating member based on the ratio determined between the calibrated cycle and verification cycle,
- calculating the angular velocity by taking the ratio of change in angular displacement with respect to time, and
- calculating the acceleration by taking the ratio of change in angular velocity with respect to time.

* * * * *